F. A. DUNN & F. G. GLASER.
PIPE.
APPLICATION FILED FEB. 24, 1908.

910,119.

Patented Jan. 19, 1909.

Witnesses

Inventors
F. A. Dunn
F. G. Glaser
By
Attorneys

UNITED STATES PATENT OFFICE.

FREEMAN A. DUNN AND FREDERICK G. GLASER, OF KEOKUK, IOWA.

PIPE.

No. 910,119.  Specification of Letters Patent.  Patented Jan. 19, 1909.

Application filed February 24, 1908. Serial No. 417,569.

*To all whom it may concern:*

Be it known that we, FREEMAN A. DUNN and FREDERICK G. GLASER, citizens of the United States, residing at Keokuk, in the county of Lee and State of Iowa, have invented certain new and useful Improvements in Pipes, of which the following is a specification.

This invention contemplates certain new and useful improvements in pipes, and the object of the invention is an improved pipe section, by means of which the pipe may be quickly and conveniently separated into its parts, and the latter may be nested, if desired, to permit the pipe to be carried from place to place in compact form, and which is designed particularly for use with pipe elbows, and is arranged to render the elbow capable of being readily adjusted to regulate the angle thereof.

With these and other objects in view, that will more fully appear as the description proceeds, the invention consists in certain constructions and arrangements of the parts that we shall hereinafter fully describe and claim.

For a full understanding of the invention and the merits thereof, reference is to be had to the following description and accompanying drawings, in which:—

Figure 1:
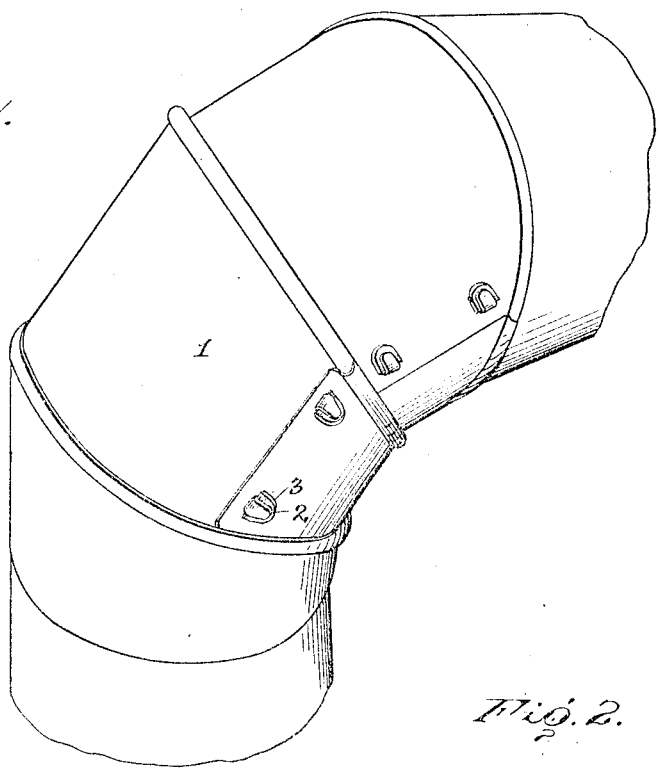
Figure 2:
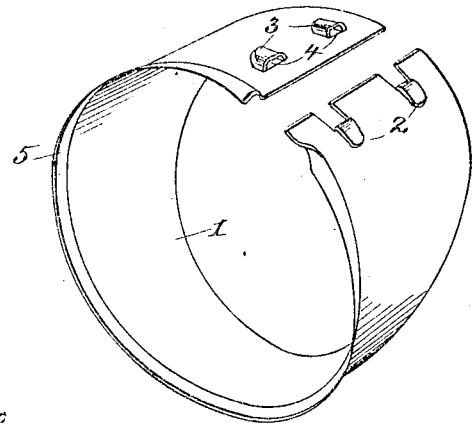
Figure 4:
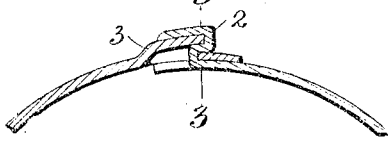
Figure 3:
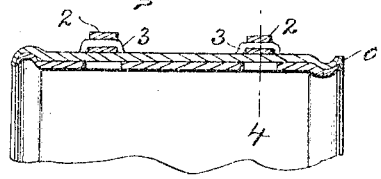

Figure 1 is a perspective view of a pipe elbow embodying our invention. Fig. 2 is a perspective view of one of our improved pipe sections. Fig. 3 is a longitudinal section through the joint of the ends of the pipe section, on the line 3—3 of Fig. 4. Fig. 4 is a transverse section on the line 4—4 of Fig. 3.

Corresponding and like parts are referred to in the following description and indicated in all the views of the drawings by the same reference characters.

Each of our improved pipe sections comprises a split ring 1, one end of which is slit to form a plurality of tongues that are initially hooked by being bent upwardly and backwardly, as shown. The other end of the ring is formed with a plurality of raised portions 3 and with a slot 4 extending through each of said raised portions and facing the first named end of the ring, said raised portions being in alinement with and being arranged to receive the respective hooked tongues 2, which are adapted to protrude through the respective slots 4 thereof, and are designed to be bent forwardly against the raised portions to lock the two ends of the ring securely together.

In order to secure two adjacent pipe sections detachably together, one of the pipe sections is formed at one edge with an annular bead 5, arranged for engagement with the outstanding rim 6 formed at the adjacent edge of the other pipe section.

In the practical use of our improved pipe sections, the rimmed section is applied to the beaded section, after the ends of the latter have been locked together, and is compressed with its rimmed end extending within the beaded end of the other section, said rimmed section being then released to permit it to expand and the rim 6 thereof to spring into engagement with the bead 5. When in such expanded position, the tongues 2 of the rimmed section are adapted to protrude through the respective slots 4, and are then bent forwardly to lock the two ends of the rimmed section together and to lock the rim thereof in engagement with the bead.

Although our improved pipe sections are illustrated as applied to a pipe elbow, it is to be understood that they are not limited to such use.

From the above description in connection with the accompanying drawing, it will be apparent that we have provided a simple, durable and efficient construction of pipe which may be readily adjusted and the sections of which may be conveniently separated to permit the pipe to be easily cleaned.

Having thus described the invention, what we claim is:—

A pipe section consisting of a split ring formed at one end with a raised portion open at its end adjacent to the other end of the ring, said other end of the ring being formed with a tongue doubled upon itself to constitute a hook, said hook being received in the raised portion and engaging a portion of said first named end, the end of said tongue being again doubled upon itself, forming a hook facing in a direction opposite to that of the first named hook and engaging said raised portion.

In testimony whereof we affix our signatures in presence of two witnesses.

FREEMAN A. DUNN. [L. S.]
FRED. G. GLASER. [L. S.]

Witnesses:
JOHN S. HERLNER,
C. A. WEBER.